Figures 1, 2, 3:
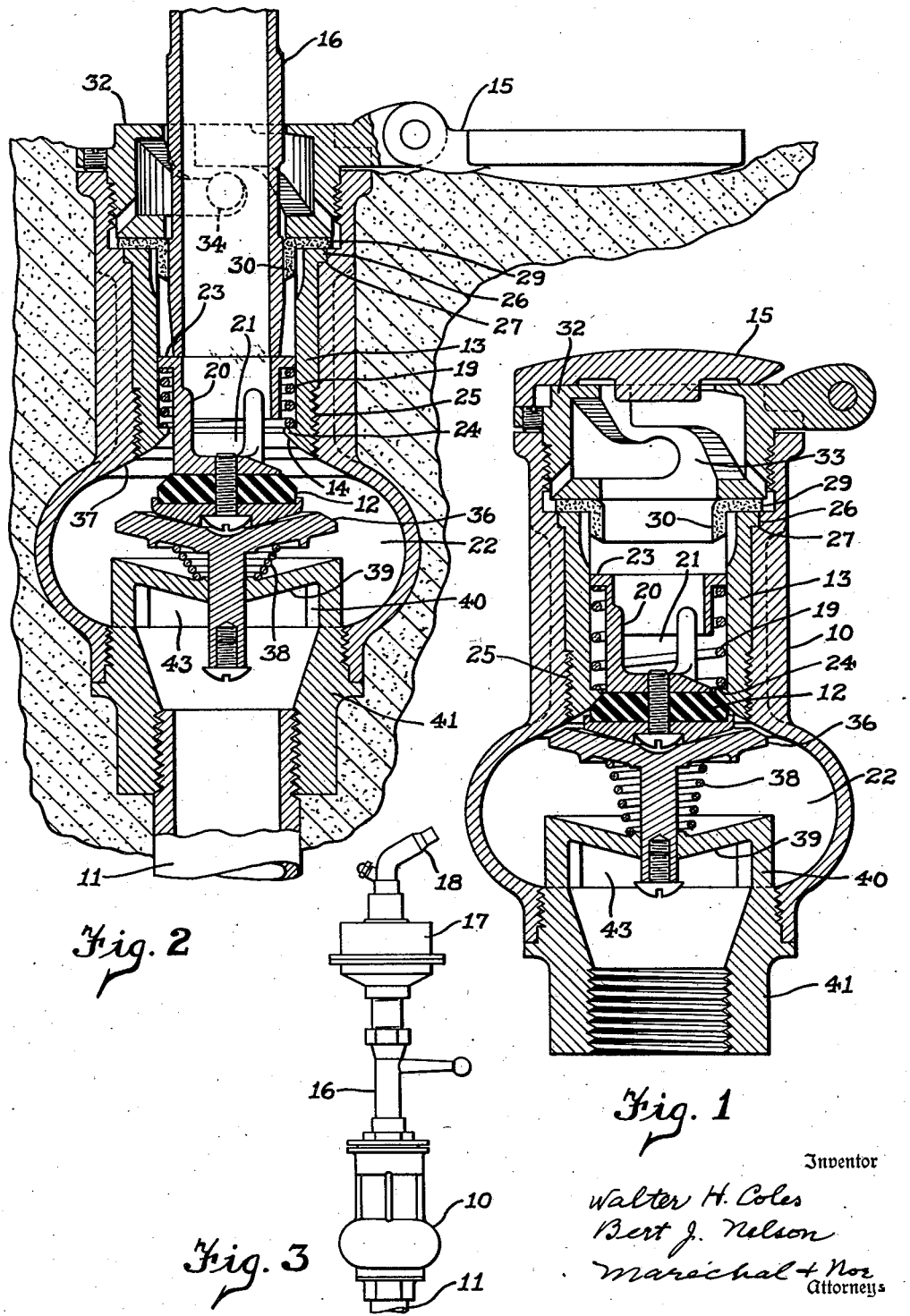

April 7, 1942.  W. H. COLES ET AL  2,278,580

SPRINKLING APPARATUS

Filed March 20, 1940

Inventor
Walter H. Coles
Bert J. Nelson
Marechal & Noe
Attorneys

Patented Apr. 7, 1942

2,278,580

UNITED STATES PATENT OFFICE 2,278,580

SPRINKLING APPARATUS

Walter H. Coles and Bert J. Nelson, Troy, Ohio, assignors to The Skinner Irrigation Company, Troy, Ohio, a corporation of Ohio Application March 20, 1940, Serial No. 325,054

1 Claim. (Cl. 284—19)

This invention relates to water sprinklers or the like, and more particularly to sprinklers or irrigating apparatus adapted for underground systems having provision for readily connecting a portable sprinkler to an underground water supply pipe.

One object of the invention is the provision of a sprinkling apparatus of the character mentioned embodying a valve body member adapted to be arranged underground and for detachable connection with a sprinkler, and containing a valve which is readily removable through the upper end of the body member, the valve cooperating with a removable valve seat member which has a rotatable connection in the body member preventing any substantial leakage of water around the valve seat member through a considerable range of axial travel during removal and normally held securely in position against unintentional loosening.

Another object of the invention is the provision of an underground sprinkling apparatus adapted for the connection and support of a sprinkler and containing a valve and valve seat which may be readily removed from the top of an underground body member without disturbing the ground and without loss of water from a maintained pressure supply.

Another object of the invention is the provision of a sprinkling apparatus adapted for connection to an underground water supply pipe and containing a valve and valve seat member adapted to be removed from the upper end of the body member and cooperating with a shut-off valve which automatically closes passages through the body member when the removable valve and valve seat are moved upwardly in the body member.

Another object of the invention is the provision of a sprinkling apparatus having a readily removable valve and valve seat unit that may be taken out through the upper end of an underground body member to which a portable sprinkler may be connected, the body member having an automatically operable valve so arranged as to prevent flow of water from the body member when the valve and valve seat unit is removed and cooperating with the valve of such unit to provide a smooth flow path offering little restriction to the flow of water.

Other objects and advantages of the invention will be apparent from the following description, the appended claim, and the accompanying drawing, in which Fig. 1 is a vertical sectional view through a sprinkling apparatus embodying the present invention;

Fig. 2 is a vertical section view of the sprinkling apparatus connected to an underground water distributing pipe and to a sprinkler supporting water conduit; and Fig. 3 is a side elevation of a portion of a sprinkling system, shown with the sprinkler attached, and illustrated on a smaller scale than Figs. 1 and 2.

Referring more particularly to the drawing, in which the preferred embodiment of the invention has been illustrated in the form of an underground sprinkling apparatus which is adapted for detachable connection to a portable sprinkler, 10 generally designates a valve containing body member of a water sprinkling system, arranged with its upper end substantially at the ground level and with its lower end connected to an underground water distributing pipe 11. Within the body member is a valve 12 cooperating with a valve seat member 13 providing a valve seat 14. The valve is closed against the valve seat when the device is not in use, and the top of the body member 10 may be covered by a hinge cover 15. When in use, however, the cover 15 is open, in the position shown in Fig. 2, and a water conduit 16 is positioned in the body member, the water conduit being so arranged as to open the valve as it is applied to the body member and to hold the valve open when it is in place so that the water can be supplied to a sprinkler 17 carried by the water conduit 16. The sprinkler can be of any desired construction, the one shown having a sprinkling nozzle 18 which is adapted to rotate on a vertical axis.

The valve 12, the valve seat member 13 and the spring 19 which normally holds the valve up against the valve seat 14 are adapted to be removed as a unit assemblage through the upper end of the body member 10, without disturbing the position of the body member in its underground location, and without making any substantial disturbance of the ground around the upper end of the body member. The valve and valve seat may thus be taken out of the body member for inspection, repair, or any other purpose. The valve 12 includes a guide barrel 20 having openings 21 through which the water may flow from the chamber 22 in the body member when the valve is open, the barrel being outwardly flanged as indicated at 23 to form an abutment for the spring 19, which engages at its lower end against an inwardly extending flange or buttress 24 on the valve seat member.

The valve seat member 13 is so connected to the body member 10 that a considerable axial travel of the valve seat member may take place in the body member without any considerable loss of water around the valve seat member. As shown the valve seat member is provided with a screw thread connection 25 in the body member, the upper end of the valve seat member preferably being outwardly flanged as indicated at 26 and fitting in a groove 27 provided in the body member 10. On the top of the valve seat member and overlapping the adjacent wall of the body member is a sealing gasket 29 having a downwardly extending ring portion 30 which engages and seals against the water conduit 16. The gasket 29 is held down firmly against the top of the valve seat member by means of a top member 32 which, as shown, is of comparatively small height, with a threaded connection to the upper end of the body member. This top member 32 is provided with a bayonet groove 33 co-operating with a bayonet pin 34 which projects from the water conduit 16 so that the water conduit may be attached by moving it downwardly and then turning it a part of a revolution. As the water conduit 16 is attached, its downward movement causes the opening of the valve 12, the lower end of the water conduit pressing downwardly on the top of the guide barrel 20 so as to move the parts to the position shown in Fig. 2. When the water conduit is removed, the spring 19 and the water pressure exerted on the valve 12 cause the valve to move upwardly into closed position against the valve seat 14. When the valve and valve seat assemblage is to be removed, the top member 32 is unscrewed, the gasket 29 is lifted out and the valve seat member 13 is then unscrewed by a suitable tool engageable with grooves or slots in its upper portion. Turning the valve seat member 13 causes it to be moved upwardly until the threads are disengaged.

It will be understood that when the water conduit 16 is applied by moving it downwardly and turning it on its own axis, any dirt that may be present between the valve and valve seat member would have a tendency to cause the valve seat member to turn with the guide barrel 20, the latter being turned due to friction by the water conduit 16 which engages its peripheral portion. This turning of the valve seat member would displace it axially in the body member. However the position of the valve seat member is definitely established because the top of the valve seat member is securely held by the top member 32 and the gasket 29, and unintentional displacement is prevented.

The water chamber 22 contains an automatically operable auxiliary valve 36 which is always open to permit passage of water through the sprinkling apparatus when the valve 12 is open, but which is adapted to be automatically closed when the valve and valve seat member are moved upwardly in the removal of those parts from the body member. This permits the valve 12 and the seat member 13 to be taken out of the body member even though the water pressure is maintained in the system, without loss of water through the body member although the valve 36 is normally ineffective as a closure member so long as the valve seat member 13 is properly positioned. The auxiliary valve 36 engages a valve seat 37 formed on the body member as soon as the valve 12 is raised a predetermined distance below its normal location indicated in Fig. 1, spring 38 moving the valve 36 under such conditions tightly against the body member to form a closure preventing passage of water through the body member. The lower end of the spring engages a deflector plate 39, of conical form, carried by legs 40 on a fitting 41 which is threaded into that portion of the body member forming the lower part of the chamber 22. The lower end of the fitting 41 is threaded onto the pipe 11. The water is supplied through lateral passages 43 between the spaced legs 40 so as to enter the chamber 22 in an outward and upward direction generally tangential to the curvature of the chamber 22 which is laterally enlarged and curved as generally indicated in the drawing. Flow from the chamber 22 between the valve 12 and the valve seat member 13 takes place in a direction generally tangential to the outer wall of the chamber 22, the construction providing for free flow without creating abrupt changes in direction and thus avoiding large friction losses. As will be noted the valve seat 37 is close to the valve seat 14, and one valve forms a continuation of the other so as to provide a gradual construction in the passage from chamber 22 to a point beyond the valves. The conical plate 39 acts to prevent water hammer when the flow of water is suddenly stopped, since it is interposed directly below the auxiliary valve 36 in line with the passage through the pipe 11.

In normal operation the water conduit 16 may be connected and disconnected for the attachment or removal of the sprinkler 17 and the auxiliary valve 36 remains ineffectively as a closure since its upward limit of travel, except when the valve 12 is being removed, is such that it is held in spaced relation from the valve seat 37. The distance between the auxiliary valve and its valve seat 37 is increased when the valve 12 is forced down by the water conduit 16 and pushes down against the upper side of the auxiliary valve. When the water conduit 16 is removed by turning it on its own axis and then pulling it upwardly, the valve 12 closes and prevents flow of water through the apparatus. With the pipe 16 removed, should occasion require it, the valve seat member 13 may be removed from the body member, after first removing the top member 32, by turning the member 13 with a suitable tool, thus causing a positive axial movement of the valve seat member as it is turned in the body member. As soon as the valve seat member has moved axially some predetermined amount, the valve 12 is thereby raised far enough to permit the auxiliary valve 36 to close against its seat 37, thus shutting off the flow of water during the continued upward movement of the valve seat member 13. As soon as the valve 36 closes, a restraint is imposed upon the continued upward movement of the valve seat member 13 because of the suction or dashpot effect of the closed space between the two valve seats, but the threaded connection between the valve seat member 13 and the body member permits a positive moving force of large value to be readily applied merely by turning the valve seat member on its own axis, to overcome the drag imposed against its upward removal. The threaded connection between the valve seat member 13 and the body member thus acts effectively in the removal of the valve seat member in overcoming the drag on that member and is of additional importance in cooperating with the top member 32 which holds it securely in position against either axial or turning movement.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

A sprinkling apparatus comprising a body member adapted to be attached to a supply pipe and to be supported underground with its upper end substantially at ground level, a valve seat member housed in and adapted for upward removal from the body member, said seat member providing a valve seat and having a screw thread connection to the body member, a valve, spring means for moving the valve upwardly against the valve seat, said valve being removable through the top of the body member when the valve seat member is removed and adapted to be opened from said valve seat by a water conduit inserted through and turned in the top of the body member, means detachably connected to the body member and having a portion overlying the upper part of the valve seat member and positively holding the valve seat member from unscrewing in the body member, and an automatically operable shut-off valve engageable with the body member to close passage therethrough when the valve seat member is moved upwardly in the body member.

WALTER H. COLES.
BERT J. NELSON.